(12) United States Patent
Hoke, Jr.

(10) Patent No.: US 7,152,637 B2
(45) Date of Patent: Dec. 26, 2006

(54) METHOD AND APPARATUS FOR DISPENSING COMPRESSED GAS

(75) Inventor: Bryan Clair Hoke, Jr., Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 157 days.

(21) Appl. No.: 11/059,742

(22) Filed: Feb. 17, 2005

(65) Prior Publication Data

US 2006/0180236 A1    Aug. 17, 2006

(51) Int. Cl.
B65B 1/04     (2006.01)
(52) U.S. Cl. ............... 141/192; 141/94; 141/83
(58) Field of Classification Search ......... 141/1, 141/2, 18, 67, 94, 95, 83, 192, 198
See application file for complete search history.

(56) References Cited

U.S. PATENT DOCUMENTS

| | | |
|---|---|---|
| 3,837,377 A | 9/1974 | McJones |
| 4,515,516 A | 5/1985 | Perrine et al. |
| 4,527,600 A | 7/1985 | Fisher et al. |
| 4,966,206 A | 10/1990 | Baumann et al. |
| 4,984,457 A | 1/1991 | Morris |
| 5,029,622 A | 7/1991 | Mutter |
| 5,156,198 A | 10/1992 | Hall |
| 5,169,295 A | 12/1992 | Stogner et al. |
| 5,238,030 A | 8/1993 | Miller et al. |
| 5,259,424 A | 11/1993 | Miller et al. |
| 5,454,408 A | 10/1995 | DiBella et al. |
| 5,597,020 A | 1/1997 | Miller et al. |
| 5,628,349 A | 5/1997 | Diggins et al. |
| 6,619,336 B1 | 9/2003 | Cohen et al. |

*Primary Examiner*—Steven O. Douglas
(74) *Attorney, Agent, or Firm*—Bryan C. Hoke, Jr.

(57) ABSTRACT

A method and apparatus for dispensing compressed gas to a receiving tank is provided where the initial density in the tank is determined, and the quantity of compressed gas to be transferred is calculated and delivered based on the initial density and a desired final density.

11 Claims, 2 Drawing Sheets

METHOD AND APPARATUS FOR DISPENSING COMPRESSED GAS

This patent application is related to U.S. patent application Ser. No. 11/059,767, entitled "System and Method for Dispensing Compressed Gas," contemporaneously filed on 17 Feb. 2005.

BACKGROUND OF THE INVENTION

The present invention relates to a method and apparatus for dispensing compressed gas. More particularly, the present invention is directed to a method and apparatus useful for transferring a compressed gas from a refueling station into one or more storage tanks.

Because of the interrelationship between the temperature, pressure, and density of gases, the amount of hydrogen, $H_2$, (or compressed natural gas (CNG)) that can safely be introduced into a storage tank, such as a vehicle storage tank, during refueling necessarily depends upon factors such as the volume, design pressure, and temperature of the tank, and the temperature and pressure of the compressed gas inside the tank. Industry convention sets the pressure rating for $H_2$ fuel tanks at the standard temperature of 15 degrees Celsius, so nominal pressure ratings such as 250 bar (25 MPa), 350 bar (35 MPa), 500 bar (50 MPa) and 700 bar (70 MPa), correspond to an internal gas temperature of 15 degrees Celsius. During rapid refueling of hydrogen, the internal tank temperature will typically rise about 50 degrees Celsius due to adiabatic compression of the gas and the reverse Joule-Thompson effect. After the tank is filled, the temperature and pressure inside the tank will decrease as the gas cools. Wide variations in ambient temperature above or below the standard condition of 15 degrees Celsius can also have a significant effect on the indicated pressure inside the tank during and after refueling.

As referred to herein, a compressed gas includes pressurized gas and supercritical fluids. A pressurized gas is a fluid below its critical pressure and below its critical temperature. A supercritical fluid is a fluid above either its critical pressure or its critical temperature.

It is desirable to have a method for dispensing compressed gas to a receiving vessel without the problem or risk of overfilling, so that an no time would the rated pressure in the tank be exceeded.

BRIEF SUMMARY OF THE INVENTION

The present invention relates to a method for dispensing a compressed gas from a compressed gas source to a receiving tank comprising connecting a dispensing connector to the receiving tank, determining an initial equivalent density of the compressed gas in the receiving tank, selecting a target equivalent density for the receiving tank, calculating a predetermined quantity of compressed gas to be added to the receiving tank as a function of at least the target equivalent density and the initial equivalent density, transferring the compressed gas from the compressed gas source to the receiving tank while measuring an accumulated quantity of compressed gas transferred, and controlling the flow of the compressed gas as a function of the accumulated quantity and the predetermined quantity.

The step of controlling the flow may include stopping the flow of the compressed gas when the accumulated quantity reaches the predetermined quantity or is within a range of the predetermined quantity.

The method of the present invention may further comprise the step of measuring a final equivalent density of the compressed gas in the receiving tank.

The present invention also relates to a method for dispensing a compressed gas from a compressed gas source to a receiving tank comprising connecting a dispensing connector to the receiving tank, determining an initial equivalent density of the compressed gas in the receiving tank by a direct density sensor selected from the group consisting of a capacitive sensor, a vibrating element sensor, and a nucleonic sensor, selecting a target equivalent density for the receiving tank, calculating a predetermined quantity of compressed gas to be added to the receiving tank as a function of at least the target equivalent density and the initial equivalent density, transferring the compressed gas from the compressed gas source to the receiving tank while measuring an accumulated quantity of compressed gas transferred, and controlling the flow of the compressed gas as a function of the accumulated quantity and the predetermined quantity.

The present invention also relates to an apparatus for dispensing a compressed gas to a receiving tank comprising a compressed gas source, a valve in fluid communication with the compressed gas source where the valve is operable by a valve signal, a fluid tight conduit having a first end and a second end wherein the first end is in fluid communication with the valve and wherein the second end is in fluid communication with a dispensing connector for connecting to the receiving tank, a means for determining the equivalent density of the compressed gas in the receiving tank, a means for calculating a predetermined quantity of compressed gas to be added to the receiving tank as a function of at least a target equivalent density and an initial equivalent density where the means for calculating is in communication with the means for determining an initial equivalent density, a means for measuring an accumulated quantity of compressed gas dispensed, a means for comparing the accumulated quantity of compressed gas dispensed with the predetermined quantity of compressed gas to be added to the receiving tank, and a means for generating the valve signal in communication with the means for comparing the accumulated quantity of compressed gas dispensed with the predetermined quantity of compressed gas to be added to the receiving tank.

An electronic controller may be the means for generating the valve signal and the means for comparing the accumulated quantity of compressed gas dispensed with the predetermined quantity of compressed gas to be added to the receiving tank.

An electronic controller may be the means for generating the valve signal, the means for comparing the accumulated quantity of compressed gas dispensed with the predetermined quantity of compressed gas to be added to the receiving tank, and the means for calculating.

The means for determining the equivalent density in the receiving tank may be a sensor selected from the group consisting of a capacitive sensor, a vibrating element sensor, and a nucleonic sensor.

The means for determining the equivalent density in the receiving tank may be integrated with the dispensing connector and/or integrated with the receiving tank.

The means for measuring an accumulated quantity of compressed gas dispensed may comprise a mass flow meter.

DETAILED DESCRIPTION OF THE INVENTION

Figure 1:
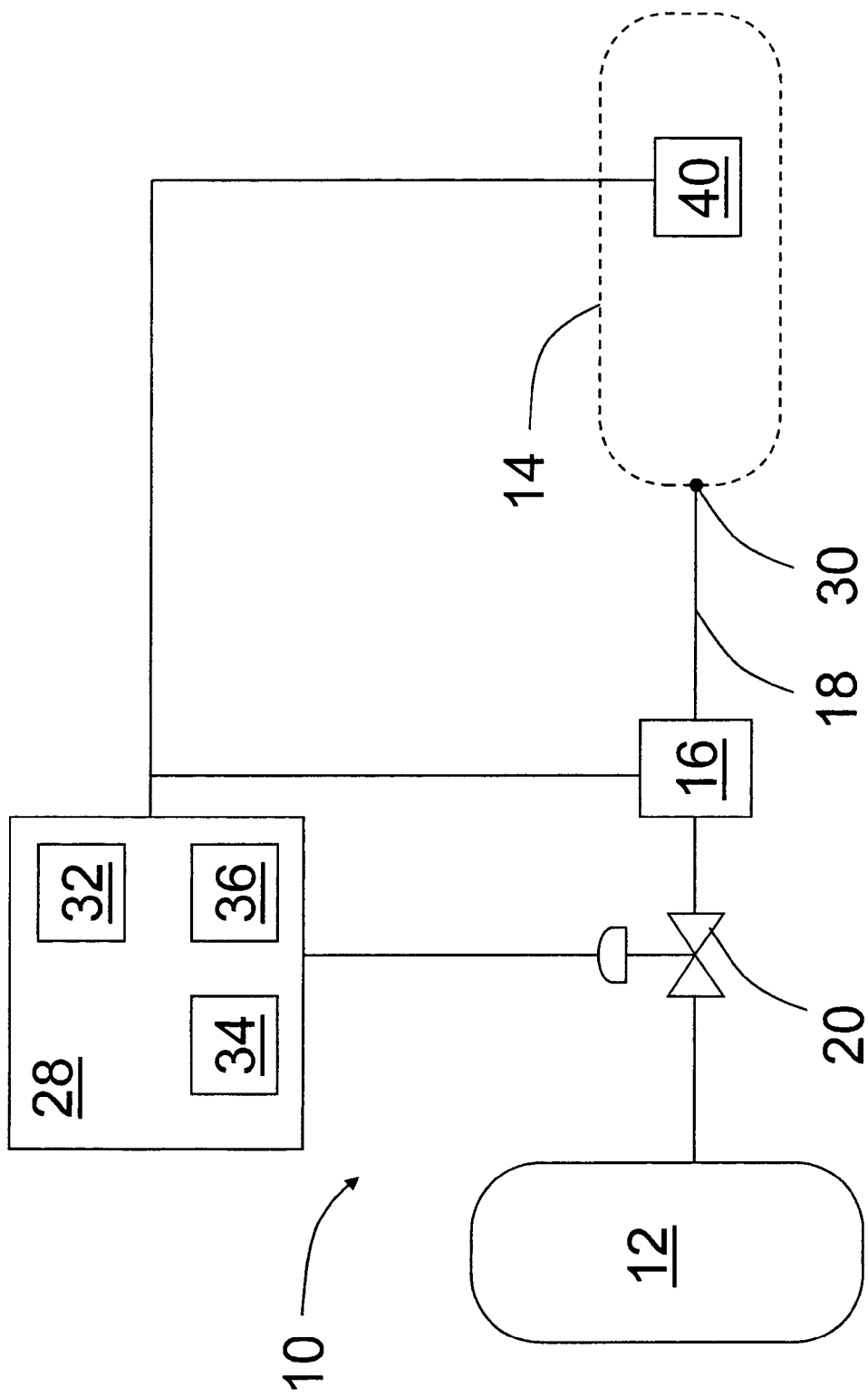
FIG. 1 is a schematic view of an embodiment of the present invention for dispensing compressed gas.

One embodiment of the current invention relates to a method for dispensing a compressed gas from a compressed gas source to a receiving tank including the steps of connecting a dispensing connector to the receiving tank, determining an initial equivalent density of the compressed gas in the receiving tank, selecting a target equivalent density for the receiving tank, calculating a predetermined quantity of compressed gas to be added to the receiving tank as a function of the target equivalent density and the initial equivalent density, transferring the compressed gas from the compressed gas source to the receiving tank while measuring an accumulated quantity of compressed gas transferred, and controlling the flow of the compressed gas as a function of the accumulated quantity and the predetermined quantity. The method may optionally include a step for measuring the final equivalent density in the receiving tank.

The compressed gas may be hydrogen gas and it may be compressed natural gas.

The equivalent density may be the mass density (mass per volume), molar density (moles per volume), or a functional equivalent, for example, any density directly related to these quantities. In case of a constant volume receiving tank, the equivalent density may also be mass, moles, or functional equivalent.

The initial equivalent density is the equivalent density of the compressed gas in the receiving tank prior to dispensing. The initial equivalent density may be determined directly using a density sensor, for example a capacitive sensor, vibrating element sensor, or nucleonic sensor. The initial equivalent density may also be determined by measuring the temperature and pressure in the receiving tank and calculating the density based on an equation of state.

The target equivalent density is the equivalent density of the compressed gas that is sought at the end of dispensing. The target equivalent density may be input as some percent of maximum allowed equivalent density for the receiving tank. The maximum allowed equivalent density or tank rated density, may be calculated based on the receiving tank specifications, for example, a manufacturer's specification, for a full tank. Tank rated pressure and temperature may be converted to a tank rated density. Therefore, the tank may be filled such that at no time during the dispensing cycle or afterward does the actual pressure inside the receiving tank exceed the manufacturer's maximum allowable pressure for that tank. The target equivalent density may be selected based on the receiving tank specifications, for example pressure rating, and the anticipated temperature range of the compressed gas inside the receiving tank. The target equivalent density may be determined from a signal or data from the receiving tank. The target equivalent density may also be selected based on any desired safety margin.

The predetermined quantity of compressed gas to be added to the receiving tank can be calculated depending on the initial density in the receiving tank, the target density, and the volume of the tank. The calculation may be done manually or by electronic means, for example a controller or computer.

The flow of compressed gas is initiated and during the transferring step, the flow of compressed gas is measured so that the accumulated quantity, or totalized flow, is obtained. The measurement of the accumulated quantity transferred may be done by any means known in the art, such as a conventional mass flow meter. This accumulated quantity dispensed may be used for billing purposes.

The flow of the compressed gas is controlled, for example by an electronic controller and a valve. The flow is controlled by the opening and closing of the valve as a function of at least the accumulated quantity and the predetermined quantity. The flow may be continued until the accumulated quantity reaches the predetermined quantity or is within some select range of the predetermined quantity.

Optionally, the equivalent density in the receiving tank may be measured after the flow of compressed gas is stopped. The final equivalent density may be determined by measuring the temperature and pressure in the receiving tank and calculating the density based on an equation of state. Alternatively, the final equivalent density may be determined directly using a density sensor, for example a capacitive sensor, vibrating element sensor, or nucleonic sensor.

Referring to the drawings, wherein like reference numbers refer to like elements throughout the views, there is shown in FIG. 1, an apparatus 10 of the current invention suitable for performing the inventive method for dispensing compressed gas to a receiving tank 14 in accordance with an embodiment of the present invention. The apparatus 10 for dispensing compressed gas comprises a compressed gas source 12, a valve 20, a means for measuring an accumulated quantity of compressed gas dispensed 16, a conduit 18 in fluid communication with a dispensing connector 30, a means for determining the equivalent density 40, a means for calculating a predetermined quantity of compressed gas to be added to the receiving tank 32, a means for comparing the accumulated quantity of compressed gas dispensed with the predetermined quantity of compressed gas to be added 34, and a means for generating a valve signal 36. As shown in this figure, the means for calculating a predetermined quantity of compressed gas to be added to the receiving tank 32, the means for comparing the accumulated quantity of compressed gas dispensed with the predetermined quantity of compressed gas to be added 34, and the means for generating a valve signal 36 may be accomplished by a single device, for example, an electronic controller or computer 28. It is understood that these functions may be accomplished by a single device or multiple devices. When reference is made to electronic controller 28, the equivalency to the appropriate means 32, 34 and 36 is understood.

The compressed gas source 12 may be a large volume storage tank, hydril tubes, a compressed gas supply line, a compressor discharge line, or any combination of these elements suitable for use in supplying gas to the receiving tank in an amount and at a pressure great enough to achieve a desired fill rate, density, and pressure in the receiving tank. The compressed gas source may also originate from a liquid source that has been pressurized and heated in a heat exchanger. In the case of hydrogen, the compressed gas source may also originate from metal hydrides or chemical hydrides.

The valve 20 is in fluid communication with the compressed gas source 12 and regulates the flow from the compressed gas source 12 to the receiving tank 14. The valve is operable, i.e. opened and closed, via a valve signal. The valve 20 may be pneumatically actuated or electrically actuated. Such valves are conventional in the art. Valve 20 may be constructed of any material known in the art compatible with the compressed gas. In case of a pneumatically operated valve, an electric signal must be converted to a pneumatic signal.

The means for measuring an accumulated quantity of compressed gas dispensed 16, for example a mass flow meter or functionally equivalent device, is in fluid communication with the valve 20. The means for measuring an accumulated quantity of compressed gas dispensed 16 may be used to measure the accumulated quantity of compressed gas transferred and communicate the accumulated quantity to the electronic controller 28. The means for measuring an accumulated quantity of compressed gas dispensed 16 may be between the valve 20 and the receiving tank 14 as shown in FIG. 1 or between the compressed gas source 12 and the valve 20. Mass flow meters are conventional and well known in the art. The total mass flow may be determined by integrating the product of density and the volume flow rate. The volume flow rate may be determined by a conventional means, for example a turbine meter. The density may be determined by a density sensor, for example a capacitive sensor, vibrating element sensor, or nucleonic sensor. U.S. Pat. Nos. 3,715,912, 4,312,235, and 5,687,100 illustrate examples of mass flow meters comprising a vibrating element sensor. U.S. Pat. No. 4,881,412 illustrates an example of a mass flow meter comprising a nucleonic sensor.

The conduit 18 links the means for measuring an accumulated quantity of compressed gas dispensed 16 to a dispensing connector 30. The conduit 18 may be constructed of any material known in the art compatible with the compressed gas. The conduit 18 may be rigid or flexible.

The dispensing connector 30 may be any suitable connector for mating to the receiving tank 14. Dispensing connectors are conventional in the art. Dispensing connector 30 may be constructed of any material in the art compatible with the compressed gas.

The means for determining the equivalent density 40 may be a density sensor. The density sensor may be disposed inside the receiving tank 14 to measure the density of the fluid inside the receiving tank 14. The density sensor may include a temperature sensor (not shown) to improve the accuracy of the density measurement. The density sensor may be incorporated or integrated in the receiving tank 14, incorporated or integrated with the dispensing connector 30, or it may be a separate device that is connected to the receiving tank 14 at the dispensing location. More than one density sensor may be used as the means for determining the equivalent density 40. The means for determining the equivalent density 40 may be a capacitive sensor, vibrating element sensor, or nucleonic sensor. The means for determining the equivalent density 40 may include a signal generator for generating a sensor signal corresponding to the density of the fluid inside the receiving tank 14. The signal generator is in communication with the electronic controller 28. The communication between the signal generator of the density sensor and the electronic controller 28 may be hardwired or wireless. The signal may be relayed to the electronic controller 28 by, for example, any conventional, commercially available devices or systems as desired.

A capacitive sensor is defined as any sensor that senses a fluid's dielectric properties. Examples of capacitive sensors are illustrated in U.S. Pat. Nos. 3,421,077, 3,903,478, 4,835, 456, and 5,027,076.

A vibrating element sensor is defined as any sensor that has a vibrating structure. It is known that, in a vibration densitometer, if a structure is vibrated at its resonant frequency while being immersed in a fluid, the density of the said fluid can be determined by measuring the resonant frequency. The vibrating element may be a vane as described in U.S. Pat. No. 3,677,067, a tuning fork as described in U.S. Pat. No. 4,526,480, a cylinder as described in U.S. Pat. No. 6,029,501, a double-bar double-ended resonator or double-bar single-ended as described in U.S. Pat. No. 4,535,638, or any other vibrating element known in the art. The vibrating element, for example a tuning fork and vane, may be surrounded by the fluid to be measured or the fluid may flow inside of the vibrating element, for example a tube. Examples of vibrating element sensors are also illustrated in U.S. Pat. Nos. 3,426,593, 3,715,912, 4,574,639, 4,644,796, 4,644,803, A nucleonic sensor is defined as any sensor that uses a radiation source and detector. The radiation may be x-ray as in U.S. Pat. No. 4,277,681, gamma-ray ($\gamma$-ray) as in U.S. Pat. Nos. 5,166,964 and 2,898,466, neutrons as in U.S. Pat. No. 4,582,991, beta-ray as in U.S. Pat. No. 2,757,290 or other radiation source known in the art. Nucleonic, also called radiation type, sensors are also discussed in U.S. Pat. Nos. 2,763,790, 2,968,729, 2,922,888, 3,196,271, and 6,548,814.

The electronic controller 28 may provide several functions. The target equivalent density for the receiving tank may be selected by the user as a percentage of the maximum allowed equivalent density and input to the electronic controller 28. The maximum allowed equivalent density may be communicated automatically from the receiving tank 14 to the electronic controller 28.

The electronic controller 28 may be hardwired or wireless communication with the sensors and valve 20.

As discussed above, the electronic controller 28 may be the means for calculating a predetermined quantity of compressed gas to be added to the receiving tank. From the target equivalent density and the initial equivalent density, the electronic controller 28 may calculate a predetermined quantity of compressed gas to be added to the receiving tank 14. For the sake of simplicity, an ideal gas equation of state will be used to illustrate the point. A 1 cubic meter receiving tank with an initial pressure of 10 MPa and a temperature of 15 degrees Celsius has a molar density of about 4,176 moles/$m^3$. If the target density is 20,882 moles/$m^3$ then the amount that can be added is 16,706 moles. This would correspond to a final pressure of 50 MPa at 15 degrees Celsius.

When the valve 20 is open, compressed gas is transferred from the compressed gas source 12 to the receiving tank 14. As the compressed gas is transferred from the compressed gas source 12 to the receiving tank 14, the means for measuring an accumulated quantity of compressed gas dispensed 16 measures the mass flow rate and communicates the result to the electronic controller 28, which calculates the accumulated quantity of compressed gas transferred. The electronic controller 28 compares the accumulated quantity to the predetermined quantity and provides a signal to the valve 20 thereby controlling the flow of the compressed gas. When the accumulated quantity is within some selected range of the predetermined quantity, the electronic controller 28 may communicate with the valve 20 to stop the flow of compressed gas.

Optionally, the density sensor used to measure the initial equivalent density may measure the density of the compressed gas in the receiving tank 14 after the valve 20 is closed to obtain a final equivalent density of the compressed gas in the receiving tank 14.

Figure 2:
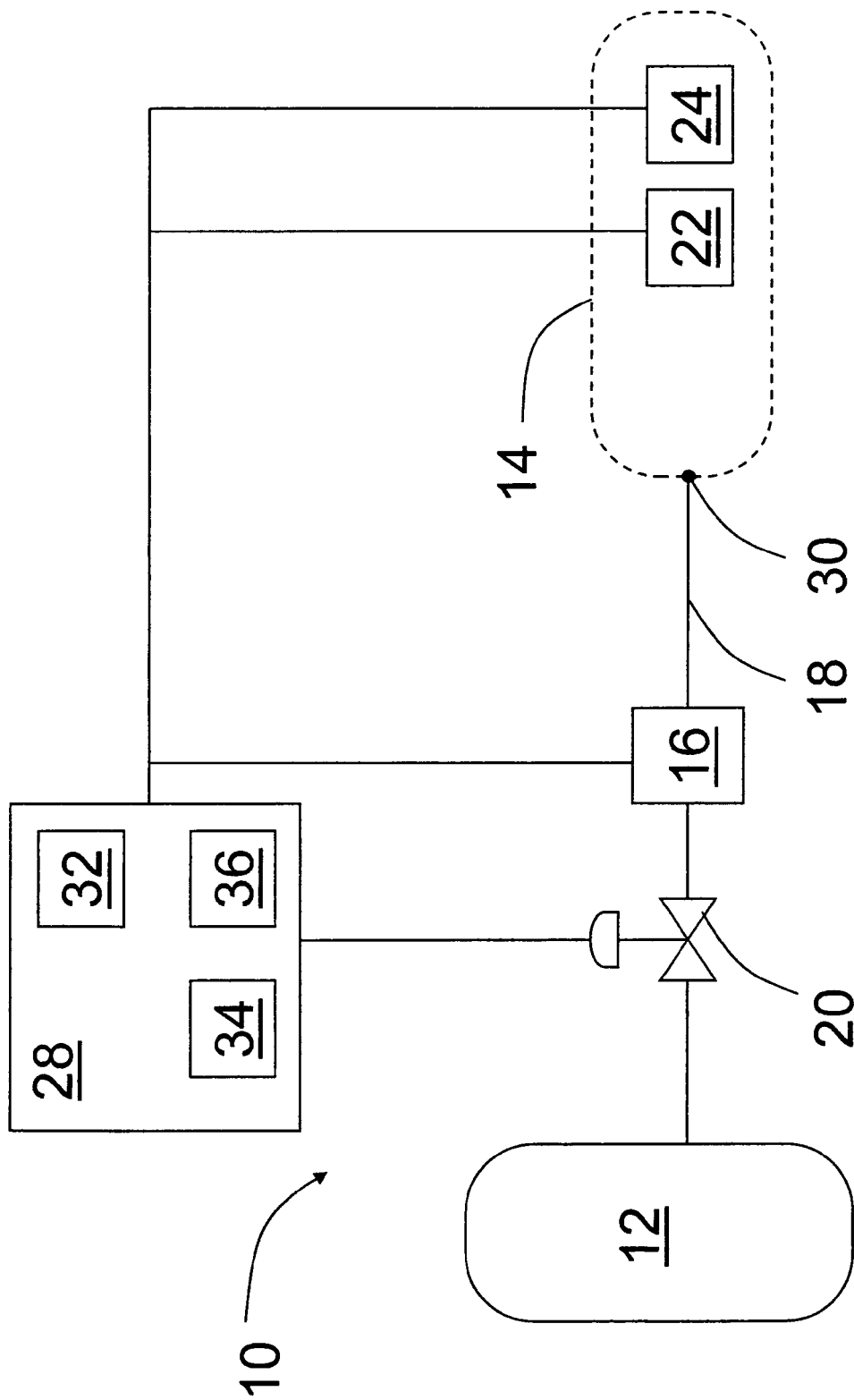
FIG. 2 is a schematic view of another embodiment of the present invention for dispensing compressed gas.

An apparatus 10 suitable for performing the inventive method for dispensing compressed gas to a receiving tank 14 in accordance with another embodiment of the present invention is illustrated in FIG. 2. The apparatus 10 for dispensing compressed gas comprises a compressed gas source 12, a valve 20, a means for measuring an accumulated quantity of compressed gas dispensed 16, a conduit 18 in fluid communication with a dispensing connector 30, a pressure sensor 22, a temperature sensor 24, and an electronic controller 28. In this alternative embodiment, the means for determining an initial equivalent density may be a pressure sensor 22 and a temperature sensor 24. Using an appropriate equation of state for the compressed gas the initial equivalent density may be calculated by, for example, the electronic controller 28, from the pressure and temperature measurements.

Other than the density measurements, all other features and steps of the invention may be achieved as described above for FIG. 1.

To use the apparatus of the invention, the dispensing connector 30 is connected to the receiving tank 14. As applicable, the electronic controller 28 may be put in hard-wired or wireless communication with the means for determining the equivalent density 40, which may include the temperature sensor 24 and pressure sensors 22 embodiment. The electronic controller 28 may collect user information. The electronic controller 28 may authorize the use of the station for an authorized user by any number of commonly used methods such as a credit card, debit card, or other magnetic or electronically encoded card, with our without an identifying Personal Identification Number or "PIN." The electronic controller 28 and the means for determining the equivalent density 40 communicate, and an initial equivalent density in the receiving tank is stored in the electronic controller 28. The electronic controller 28 may read a tank rated density for the receiving tank 14 or the user may input the tank rated density. The user may input the target equivalent density for the receiving tank as a percentage of the maximum allowed equivalent density to the electronic controller 28 corresponding to the desired fill amount. The electronic controller calculates a predetermined quantity of compressed gas to be added as a function of the target equivalent density and the initial equivalent density. The electronic controller instructs the valve 20 to open and compressed gas is transferred to the receiving tank 14. The means for measuring an accumulated quantity of compressed gas dispensed 16 communicates the mass flow to the electronic controller 28 and the electronic controller calculates the accumulated quantity and compares to the predetermined quantity. When the accumulated quantity comes within a selected range of the predetermined quantity, the electronic controller 28 instructs the valve 20 to close.

After filling is complete the dispensing connector 30 is detached from the receiving tank 14 and communication between the means for determining the equivalent density 40 and electronic controller 28 may be stopped. The electronic controller 28 may communicate with another computer for billing the user for the accumulated quantity of compressed gas transferred.

Although illustrated and described herein with reference to specific embodiments, the present invention nevertheless is not intended to be limited to the details shown. Rather, various modifications may be made in the details within the scope and range of equivalents of the claims without departing from the spirit of the invention.

What is claimed is:

1. A method for dispensing a compressed gas from a compressed gas source to a receiving tank comprising:
   connecting a dispensing connector to the receiving tank;
   determining an initial equivalent density of the compressed gas in the receiving tank;
   selecting a target equivalent density for the receiving tank;
   calculating a predetermined quantity of compressed gas to be added to the receiving tank as a function of at least the target equivalent density and the initial equivalent density;
   transferring the compressed gas from the compressed gas source to the receiving tank while measuring an accumulated quantity of compressed gas transferred; and
   controlling the flow of the compressed gas as a function of the accumulated quantity and the predetermined quantity.

2. The method of claim 1 wherein the step of controlling the flow comprises stopping the flow of the compressed gas when the accumulated quantity reaches the predetermined quantity or is within a range of the predetermined quantity.

3. The method of claim 1 further comprising the step of measuring a final equivalent density of the compressed gas in the receiving tank.

4. A method for dispensing a compressed gas from a compressed gas source to a receiving tank comprising:
   connecting a dispensing connector to the receiving tank;
   determining an initial equivalent density of the compressed gas in the receiving tank by a direct density sensor selected from the group consisting of a capacitive sensor, a vibrating element sensor, and a nucleonic sensor;
   selecting a target equivalent density for the receiving tank;
   calculating a predetermined quantity of compressed gas to be added to the receiving tank as a function of at least the target equivalent density and the initial equivalent density;
   transferring the compressed gas from the compressed gas source to the receiving tank while measuring an accumulated quantity of compressed gas transferred; and
   controlling the flow of the compressed gas as a function of the accumulated quantity and the predetermined quantity.

5. An apparatus for dispensing a compressed gas to a receiving tank comprising:
   a compressed gas source;
   a valve in fluid communication with the compressed gas source, said valve operable by a valve signal;
   a fluid tight conduit having a first end and a second end wherein the first end is in fluid communication with said valve and wherein the second end is in fluid communication with a dispensing connector for connecting to the receiving tank;
   a means for determining the equivalent density of the compressed gas in the receiving tank;
   a means for calculating a predetermined quantity of compressed gas to be added to the receiving tank as a function of at least a target equivalent density and an initial equivalent density, said means for calculating in communication with said means for determining the equivalent density;

a means for measuring an accumulated quantity of compressed gas dispensed;

a means for comparing the accumulated quantity of compressed gas dispensed with the predetermined quantity of compressed gas to be added to the receiving tank; and a means for generating the valve signal in communication with the means for comparing the accumulated quantity of compressed gas dispensed with the predetermined quantity of compressed gas to be added to the receiving tank.

6. The apparatus of claim 5 wherein an electronic controller is the means for generating the valve signal and the means for comparing the accumulated quantity of compressed gas dispensed with the predetermined quantity of compressed gas to be added to the receiving tank.

7. The apparatus of claim 5 wherein an electronic controller is the means for generating the valve signal, the means for comparing the accumulated quantity of compressed gas dispensed with the predetermined quantity of compressed gas to be added to the receiving tank, and the means for calculating.

8. The apparatus of claim 5 wherein the means for determining the equivalent density is at least one sensor selected from the group consisting of a capacitive sensor, a vibrating element sensor, and a nucleonic sensor.

9. The apparatus of claim 5 wherein the means for determining the equivalent density is integrated with the dispensing connector.

10. The apparatus of claim 5 wherein the means for determining the equivalent density is integrated with the receiving tank.

11. The apparatus of claim 5 wherein the means for measuring an accumulated quantity of compressed gas dispensed comprises a mass flow meter.

* * * * *